United States Patent [19]

Sawaide

[11] Patent Number: 4,722,861
[45] Date of Patent: Feb. 2, 1988

[54] LIGHTWEIGHT AGGREGATE HAVING HIGH RESISTANCE TO WATER ABSORPTION AND PROCESS FOR PREPARATION THEREOF

[75] Inventor: Minoru Sawaide, Tokyo, Japan
[73] Assignee: Shimizu Construction Co., Ltd., Tokyo, Japan
[21] Appl. No.: 925,646
[22] Filed: Oct. 31, 1986
[30] Foreign Application Priority Data Jan. 31, 1986 [JP] Japan ................... 61-19534

[51] Int. Cl.⁴ .................... B05D 7/00; B32B 3/26
[52] U.S. Cl. ................... 428/304.4; 427/215; 427/220; 428/403; 428/703
[58] Field of Search ................. 427/215, 220; 428/304.4, 312.2, 403, 404, 703

[56] References Cited

U.S. PATENT DOCUMENTS

| | | | |
|---|---|---|---|
| 2,639,269 | 5/1953 | Dube | 427/215 |
| 2,650,171 | 8/1953 | Schaaf | 427/215 |
| 3,769,065 | 10/1973 | Dunn | 427/215 |
| 4,039,297 | 8/1977 | Takenaka | 428/403 |
| 4,172,744 | 10/1979 | Ishikawa | 427/215 |
| 4,268,558 | 5/1981 | Boardman | 428/403 |
| 4,504,402 | 3/1985 | Chen et al. | 428/403 |

FOREIGN PATENT DOCUMENTS

| | | | |
|---|---|---|---|
| 55-49035 | 12/1980 | Japan | 428/304.4 |
| 795823 | 5/1958 | United Kingdom | 428/312.2 |

Primary Examiner—William J. Van Balen
Attorney, Agent, or Firm—Armstrong, Nikaido, Marmelstein & Kubovcik

[57] ABSTRACT

A lightweight aggregate which is inexpensive and excellent in both resistance to freezing and thawing and resistance to water absorption and a process for preparation of such lightweight aggregate are disclosed. In this lightweight aggregate, a gel material is filled in at least open pores in the surface layer of a lightweight porous aggregate among a multiplicity of open pores therein. The preparation process includes the steps of injecting a raw material solution for gel formation in at least open pores in the surface layer of a lightweight porous aggregate among a multiplicity of open pores therein, and allowing the material solution to gel, thereby forming a gel material in at least the open pores in said surface layer so as to fill them with the gel material. Also disclosed is another preparation process which includes the steps of submerging a heated lightweight porous aggregate in a raw material solution for gel formation so as to fill the raw material solution in at least open pores in the surface layer of the aggregate among a multiplicity of open pores therein through suction by the reduced pressure effect caused by cooling of the aggregate, and converting the material solution filled in the open pores to a gel, thereby forming a gel material in said open pores so as to fill them with the gel material.

6 Claims, 2 Drawing Figures

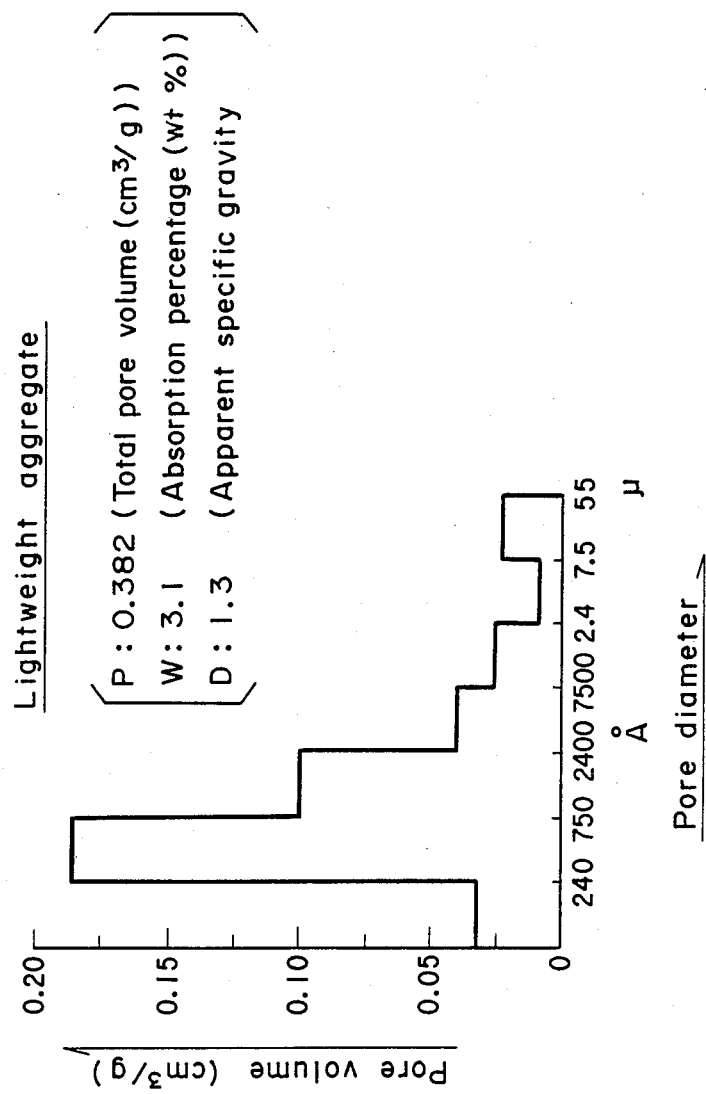

LIGHTWEIGHT AGGREGATE HAVING HIGH RESISTANCE TO WATER ABSORPTION AND PROCESS FOR PREPARATION THEREOF

BACKGROUND OF THE INVENTION

The present invention relates to a lightweight aggregate which is inexpensive and excellent in both resistance to freezing and thawing and resistance to water absorption. The present invention also pertains to a process for preparation of such lightweight aggregate.

Conventional lightweight aggregates generally involve a high water absorption, and the flash water absorption percentage thereof is known to be about 30% of the 24-hour water absorption percentage. For this reason, when such conventional aggregate in an air-dry state is used, the slump of concrete is degraded during mixing or conveying of the concrete.

To overcome such disadvantage, it is conventional practice to subject a lightweight aggregate to a prewetting treatment, i.e., a pretreatment in which the lightweight aggregate is watered so as to absorb water appropriately, before it is mixed into concrete for an actual use, thereby preventing any reduction in consistency.

However, the prewetting processing operation disadvantageously complicates both mixing of concrete and moisture control, and it is not a sufficiently reliable treatment in view of the concrete conveying system by pump and the prevention against frost damage.

To cope with the above-described problems, various types of processing method have already been proposed for the purpose of lowering the water absorption of lightweight aggregates (i.e., improving the resistance to water absorption thereof). For examples, the following methods have heretofore been known: (A) a method wherein a lightweight aggregate is rolled over a slope, and while doing so, it is subjected to curing application with a viscous material or a covering material; (B) a method wherein the surface of a lightweight aggregate is subjected to a covering treatment using a liquid solution type petrolic resin; and (C) a method wherein the surface of a lightweight aggregate is subjected to a covering treatment using straignt asphalt.

The above-described conventional methods suffer, however, from the following problems. Namely, with a preventive technique to water absorption such as the method (A), it is impossible to provide a lightweight aggregate having high resistance to water absorption that can be used in the concrete conveying system by pump wherein concrete which has not yet solidified is placed. In other words, there has been provided no lightweight aggregate which satisfies the following conditions, i.e., target values which are to be reached:

(a) To ensure a water absorption percentage of 4% or less under a pressure of 40 kg/cm$^2$.

(b) To possess a high resistance to freezing and thawing, i.e., DF value 80 or more at 300 cycles.

When a petrolic resin material is employed as a coating material as in the case of the prior art method (B), the following disadvantages may be experienced.

First, resin materials involve the problem that, as hardening of a resin material progresses, shrinkage occurs, and this leads to generation of pinholes. It is necessary in order to prevent the generation of pinholes to laminate a multiplicity of resin layers, which means that this prior art method is impractical from the costwise point of view. It has been found that a thermal hardening resin particularly shrinks through hardening reaction and cooling taking place subsequently, resulting in a considerable internal stress.

The internal stress in the resin leads to not only lowering in the strength of the system but also generation of microcracks and pinholes.

Secondly, as will also be clear from the porous structure of lightweight aggregates, it is necessary, in order to satisfactorily impregnate a coating material into micron order pores (capillary tubes), to employ a coating material having a relatively low coefficient of viscosity and conduct operations such as pressing impregnation with a relatively large pressure difference, which fact involves increased costs, disadvantageously.

Thirdly, there is the problem of interfacial peeling caused due to the difference in terms of thermal expansion coefficient between a lightweight aggregate and a coating material. In regard to the water absorption performance under pressure in the concrete conveying system by pump, the existence of any space at the interface between the lightweight aggregate and the coating material is particularly fatal.

Fourthly, a resinous coating material takes a certain period of time to terminate hardening reaction, and this involves the problem that the tack of the coating material bonded to the surface of the aggregate remains undesirably. In consequence, there is a risk of particles of the aggregate bonding to each other in the shape of a millet and rice cake. For this reason, it is extremely difficult, with the existing technology, to effect coating of a lightweight aggregate for each individual particle thereof.

The upper limit cost of coating which is allowed for a preventive technique to water absorption is generally needed to be 50% or less of the total cost of the lightweight aggregate employed from the economical point of view. If, for example, a multiplicity of coating layers of a petrolic resin are provided on the surface of a lightweight aggregate in a plurality of steps, the cost of the lightweight aggregate is raised by 200 to 300% because of the cost of the resin and the process costs.

In addition, general resinous coating materials involve excessively high costs as materials which are used for prevention of water absorption of aggregates, i.e., even relatively inexpensive ones are 200 to 300 yens per killogram.

On the other hand, it may also be possible to employ various kinds of polymer emulsion as coating materials. However, polymer emulsions suffer from the following disadvantages:

(a) The dynamic strength of polymer emulsions is lower than those of general thermal plastic resins and thermal hardening resins.

(b) It is difficult to form a relatively thick covering layer.

In addition, since water (generally about 50%) contained in a polymer emulsion is stored for a long time in the aggregate by the covering layer formed on the surface of the aggregate, the water may have a bad influence on a freezing and thawing test.

A preventive technique to water absorption using straight asphalt such as the method (C) also has the problem that it is not possible to attain prevention of water absorption which is satisfactorily effective under a pressure of 40 kg/cm$^2$ in the concrete conveying system by pump.

SUMMARY OF THE INVENTION

In view of the above-described problems of the prior art, it is a primary object of the present invention to provide a lightweight aggregate having excellent resistance to water absorption.

The basic technique to provide the lightweight aggregate according to the present invention features provision of a "waterproof plug" of an appropriate material in each of the open pores in the outer surface layer of a lightweight porous aggregate among a multiplicity of open pores which are continuously present in the aggregate, and adoption of so-called sol-to-gel conversion technique (conversion of a sol into a gel) for forming the "waterproof plug".

More specifically, the present invention provides: (1) a lightweight aggregate having improved resistance to water absorption wherein a gel material is filled in at least open pores in the surface layer of a lightweight porous aggregate among a multiplicity of open pores therein; (2) a process for preparation of a lightweight aggregate having high resistance to water absorption wherein a raw material solution for gel formation is injected in at least open pores in the surface layer of a lightweight porous aggregate among a multiplicity of open pores therein, and the raw material solution is then allowed to gel, thereby forming a gel material in at least the open pores in said surface layer so as to fill them with the gel material; and (3) a process for preparation of a lightweight aggregate having high resistance to water absorption wherein a heated lightweight porous aggregate is submerged in a raw material solution for gel formation so as to fill the material solution in at least open pores in the surface layer of the aggregate among a multiplicity of open pores therein through suction by the reduced pressure effect caused by cooling of the aggregate, and the material solution filled in the open pores is then converted to a gel, thereby forming a gel material in said open pores so as to fill them with the gel material.

BRIEF DESCRIPTION OF THE DRAWINGS

FIG. 2 is a graph showing the pore system distribution of a marketing lightweight aggregate (A).

DETAILED DESCRIPTION OF THE INVENTION

Figure 1:
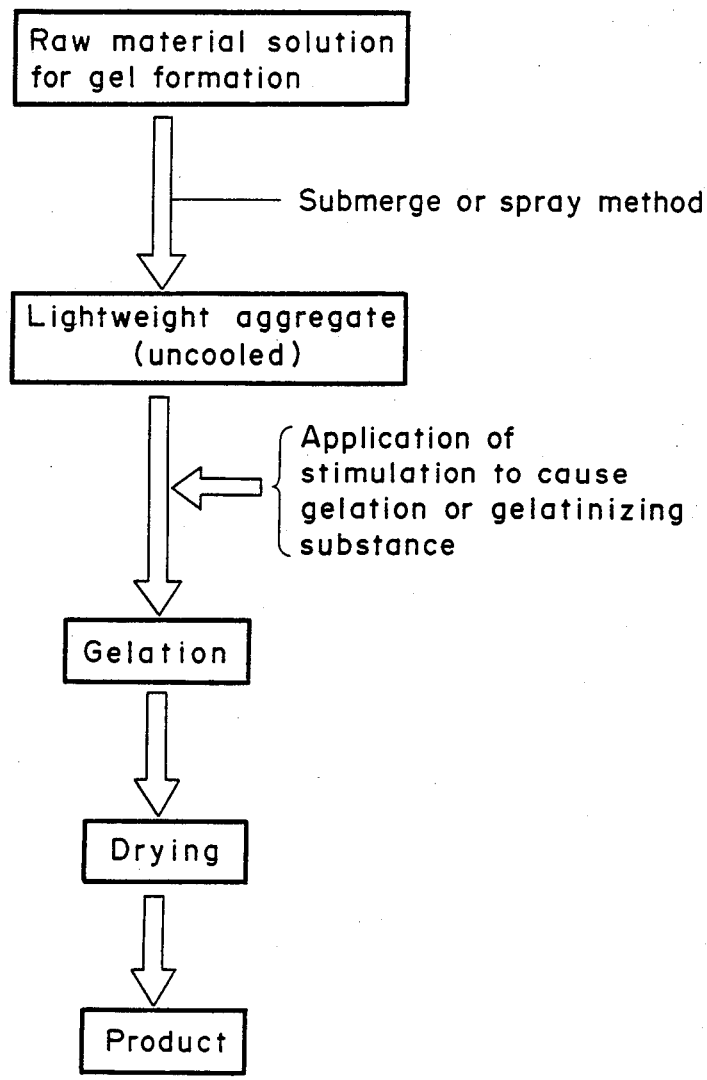
FIG. 1 is a flow sheet schematically showing the preparation process according to the present invention.

The present inventor accomplished this invention after the following exhaustive study of the porous structure and water absorption percentage of lightweight aggregates.

The present inventor first noticed the following facts.

Table 1 below shows the water absorption percentage of an ordinary lightweight aggregate (A) produced by firing ground shale.

TABLE 1

| Water absorption percentage of lightweight aggregate (A) | | | |
|---|---|---|---|
| | specific gravity $\rho$ | 24-hour absorption percentage | boil absorption percentage | saturation coefficient |
| Ordinary product | 1.25 | 5% | 10% | 0.5 |
| Ultra-lightweight product | 0.8 | 12% | 50% | 0.24 |

By the examination of the pore system distribution and characteristics of expansion and shrinkage of the lightweight aggregates, the following results have been obtained.

Namely, it has been confirmed that the total amount of pores in each lightweight aggregate is substantially in inverse proportion to the size of the apparent specific gravity thereof. As to the relationship between the 24-hour absorption percentage and the total amount of pores, a lightweight aggregate which has a relatively high absorption percentage does not always have a relatively large total amount of pores. For example, in pumice, about 50% of the total amount of pores are filled with absorbed water, whereas, in the above-described lightweight aggregate, only 8% of the total amount of pores are filled with absorbed water.

FIG. 2 shows results of examination of pore system distribution of the above-described lightweight aggregate, the amount of pores having a diameter of 750 Å or less accounts for 50% of the total amount of pores.

The present inventor examined the relationship between the porous structure and water absorption percentage of the above-described lightweight aggregate and reached the conclusion that it is preferable to provide a "waterproof plug" of an appropriate material in each of the open pores which are contiguous with the outer surface of the lightweight aggregate (which pores have pore diameters around 7.5 to 50 $\mu$m according to the result shown in FIG. 2), and to adopt so-called sol-to-gel conversion technique (conversion from a sol into a gel) for forming the "waterproof plug".

The present inventor is convinced that it is unnecessary to apply coating in such a manner that the covering layer extends to the surface of the skeletal portion of the lightweight aggregate in addition to the open pores, i.e., over the whole surface of the aggregate.

On the basis of the above-described technical idea, the present invention has been accomplished.

Thus, the present invention provides: (1) a lightweight aggregate having improved resistance to water absorption wherein a gel material is filled in at least open pores in the surface layer of a lightweight porous aggregate among a multiplicity of open pores therein; (2) a process for preparation of a lightweight aggregate having high resistance to water absorption wherein a raw material solution for gel formation is injected in at least open pores in the surface layer of a lightweight porous aggregate among a multiplicity of open pores therein, and the raw material solution is then allowed to gel, thereby forming a gel material in at least the open pores in said surface layer so as to fill them with the gel material; and (3) a process for preparation of a lightweight aggregate having high resistance to water absorption wherein a heated lightweight porous aggregate is submerged in a raw material solution for gel formation so as to fill the material solution in at least open pores in the surface layer of the aggregate among a multiplicity of open pores therein through suction by the reduced pressure effect caused by cooling of the aggregate, and the material solution filled in the open pores is then converted to a gel, thereby forming a gel material in said open pores so as to fill them with the gel material.

It is impossible to satisfactorily fill a raw material solution for gel formation in micron order pores in a lightweight aggregate simply by carrying out, for example, a conventional submerging technique as derived from the Hagen-Poiseuille's method.

Examples of methods which may be employed to solve the above-described problem include one in which a raw material solution for gel formation is pressurized and another in which a raw material solution for gel formation is brought into contact with a lightweight aggregate which is placed in a reduced pressure atmosphere produced by vacuum suction.

A method which is particularly recommended in the present invention is such that a heated lightweight porous aggregate is submerged in a colloid solution (a raw material solution for gel formation) of fine particles prepared by dispersing them into a medium such as water or oil, thereby filling the material solutation in open pores in the aggregate. More specifically, in this method the temperature of the heated lightweight aggregate lowers when it is submerged in the raw material solution for gel formation, resulting in a reduction in pressure within the open pores in the aggregate, and thus allowing the material solution to be readily filled in the open pores. In this method, it suffices to set $\Delta T$ in the formula $PV = nRT$ at about $100°$ C. Thus, it is possible to readily fill a preventive agent against water absorption in open pores within a lightweight porous aggregate.

In actual industrial production, the method according to the present invention can be practiced simply by adding an auxiliary apparatus to a conventional lightweight aggregate production line, and in this case production costs are considerably low. Although such production line generally needs a step of cooling a fired lightweight aggregate, it is possible, according to the method of the present invention, to replace the cooling step by the step of submerging the aggregate in a raw material solution for gel formation.

The following is a description of the raw material solution for gel formation employed in the present invention.

As a raw material solution for gel formation, it is possible to employ any material which is able to gel alone with some stimulation such as a temperature change in cooling or heating, e.g., agar-agar, gelatin and egg white, or any material which is converted to a gel through a reaction with another substance (e.g., acids, alkalis, alcohol or salts), e.g., sodium silicate and casein.

In the case of employing a raw material solution for gel formation which gels through a reaction with another substance, a lightweight aggregate which has already been injected with the raw material solution may be brought into contact with the second substance, or conversely, the raw material solution may be brought into contact with the lightweight aggregate injected with the second substance.

It should be noted that, in place of the injection of a raw material solution for gel formation, an ultra fine particle powder may be injected by means of spraying or deposition.

FIG. 1 is a flow sheet which schematically shows processing steps of the process according to the present invention.

The present invention, which employs a gel material as a waterproof material for a lightweight aggregate, provides the following advantages:

(1) Since the gel material is a flabby jellylike substance such as solidified agar-agar, when such gel material is filled in the space surrounded by rigid porous walls of the skeletal portion of a lightweight aggregate, the gel material is able to chanbe its shape in response to any external pressure applied thereto in the direction in which it is compressed. Therefore, any gap generated between the porous walls of the aggregate and the gel can readily be filled up with the gel which is deformed by the external pressure. In consequence, even when an external pressure such as water pressure is applied to the lightweight aggregate, intrusion of water into the aggregate is prevented, advantageously.

(2) The gel material is not readily frozen even when the outside temperature is below freezing point, and is able to absorb or lessen any increase in pressure caused by the volume expansion of the water retained in the skeletal aggregate at low temperature. Thus, the gel has excellent low-temperature characteristics, and it is therefore possible to obtain a high resistance to freezing and thawing.

(3) Since a hydrosol or a non-aqueous sol as a raw material solution for gel formation is capable of readily permeating into capillary tubes in the aggregate skeleton, it is possible to extremely readily carry out the step of injecting the raw material solution into open pores in the aggregate. A sol is a colloidal dispersion of a substance in the form of particles which are larger than atoms or low-molecular weight molecules although this cannot be confirmed by a microscope. Therefore, impregnation is also considerably readily effected.

(4) Gel materials generally involve low costs, and it is possible, according to the present invention, to select a common inexpensive material, e.g., gelatin, glue and arabic rubber. When such gel material is formed into a gel using an oil (vegetable oil, mineral oil, useless oil, etc.) as a solvent, pores in a lightweight aggregate are injected with a gel which is lightweight and has water repellent properties, which means that the lightweight aggregate is greatly improved in the resistance to freezing and thawing. In such case, the oily gel material applied to the surface of the aggregate is readily removed and therefore constitutes no obstacle to bonding between the aggregate and a cement paste.

(5) The water permeability of the gel material filled in pores favorably decreases as the pressure applied by the concrete conveying system by pump increases by virtue of its compressibility.

(6) Unlike a lightweight aggregate subjected to the conventional resin coating method, the lightweight aggregate subjected geletion treatment involves no risk of aggregate particles bonding to each other in the shape of a millet and rice cake.

The present invention will be described hereinunder in more details by way of examples. It should be noted that the following examples are only illustrative and the present invention is not limited thereby.

First of all, water was added to sodium silicate to prepare an aqueous sodium silicate solution having a specific gravity of 1.15.

A lightweight aggregate (trade name: Bilton) heated to $200°$ C. was submerged in the aqueous sodium silicate solution maintained at room temperature. The aggregate was submerged in the aqueous solution for 10 minutes while being vibrated. During the submerging step, the bath temperature of the aqueous sodium silicate solution was raised by the introduction of the heated aggregate, but the bath temperature of the solution was adjusted so as not to rise above $50°$ C. by circulating cooling water.

Thereafter, the lightweight aggregate was taken out of the aqueous sodium silicate solution and rotated on a woven metal sieve to remove surplus aqueous sodium silicate solution attached to the surface of the aggregate.

Then, the lightweight aggregate was submerged in an aqueous sodium alginate solution for 3 to 5 minutes, the temperature of the solution being adjusted at between 10° C. and 25° C., and then the aggregate was taken out of the solution and left to stand at 30° C. or lower so as to become a gel.

The lightweight aggregate thus obtained and a non-treated lightweight aggregate for comparison underwent a pressure absorption test (40 kg/cm$^2$×10 min). Results of the test are shown in Table 2 below.

TABLE 2

|  | Weight before absorption of water (g) | Weight after absorption of water (g) | Absorption percentage (%) |
|---|---|---|---|
| Sample 1 | 309.3 | 311.6 | 0.74 |
| Sample 2 | 306.6 | 308.6 | 0.65 |
| Sample 3 | 301.0 | 303.0 | 0.76 |
| Non-treated | 299.5 | 350.5 | 17.0 |

As will be understood from the results of the test, the fact that the water absorption percentage under a pressure of 40 kg/cm$^2$ is less than 1% means that the lightweight aggregates according to the present invention can satisfactorily be employed as lightweight aggregates for the concrete conveying system by pump.

Examples of gel materials which may be employed in the present invention are as follows.

(1) Inorganic gel materials:
   silicate gel, alminium hydroxide gel, ferric hydroxide gel, magnesium hydroxide gel, stabilized calcium carbonated gel (2) Organic gel materials:
   cellulose acetate gel, nitrocellulose gel (collodion), alkohol+sodium oleic acid gel (3) Natual organic gels:
   dextran gel (cephadex), casein gel, gelatin gel, agar gel (4) Oil gels:
   vegetable gel, mineral oil gel, useless oil gel, etc.

As has been described above in detail, the present invention offers the following great advantages:

(1) The gel material which is filled in the space surrounded by porous walls of the skeletal portion of a lightweight aggregate is able to change its shape in response to any external pressure applied thereto in the direction in which it is compressed. Therefore, any gap generated between the porous walls of the aggregate and the gel can readily be filled up with the gel which is deformed by the external pressure. In consequence, even when an external pressure such as water pressure is applied to the lightweight aggregate, intrusion of water into the aggregate is prevented, advantageously. Thus, the lightweight aggregate has excellent resistance to water absorption.

(2) The gel material is not readily frozen even when the outside temperature is below freezing point, and is able to absorb or lessen any increase in pressure caused by the volume expansion of the water retained in the skeletal aggregate at low temperature. Thus, the gel has excellent low-temperature characteristics, and it is therefore possible to obtain a lightweight aggregate having high resistance to freezing and thawing.

(3) Since a hydrosol or a non-aqueous sol as a raw material solution for gel formation is capable of readily permeating into capillary tubes in the aggregate skeleton, it is possible to extremely readily carry out the step of injecting the raw material solution into open pores in the aggregate, so that it is easy to produce a lightweight aggregate having high resistance to water absorption.

(4) In the step in which a heated lightweight aggregate immediately after firing is submerged in a raw material solution for gel formation, the aggregate is suddenly cooled to reduce the air pressure in the air gaps defined within open pores in the aggregate, whereby the raw material solution is effectively injected into the open pores in the aggregate by means of suction. Thus, it is possible to readily produce a lightweight aggregate having excellent resistance to water absorption effectively utilizing heat energy simply by adding an auxiliary apparatus to a conventional lightweight aggregate production line.

(5) Unlike a lightweight aggregate subjected to the conventional resin coating method, the lightweight aggregate subjected geletion treatment involves no risk of aggregate particles bonding to each other in the shape of a millet and rice cake.

(6) Since gel materials generally involve low costs, it is possible to obtain a lightweight aggregate having high resistance to water absorption at low costs.

Thus, the lightweight aggregate and the process for preparation thereof according to the present invention are novel and provide a large number of advantages.

What is claimed is:

1. A lightweight aggregate having high resistance to water absorption, comprising:
   a lightweight porous aggregate; and
   a gel material filled in at least open pores in the surface layer of said lightweight porous aggregate among a multiplicity of open pores therein.

2. A lightweight aggregate according to claim 1, wherein said gel material is produced by converting a sol into a gel within the open pores in said lightweight porous aggregate.

3. A process for preparation of a lightweight aggregate having high resistance to water absorption, comprising the steps of:
   injecting a raw material solution for gel formation in at least open pores in the surface layer of a lightweight porous aggregate among a multiplicity of open pores therein; and
   allowing said material solution to gel, thereby forming a gel material in at least the open pores in said surface layer so as to fill them with said gel material.

4. A process according to claim 3, wherein the injection of said raw material solution for gel formation into said lightweight porous aggregate is effected by spraying or impregnation.

5. A process for preparation of a lightweight aggregate having high resistance to water absorption, comprising the steps of:
   submerging a heated lightweight porous aggregate in a raw material solution for gel formation so as to fill said raw material solution in at least open pores in the surface layer of said aggregate among a multiplicity of open pores therein through suction by the reduced pressure effect caused by cooling of said aggregate; and
   converting said material solution filled in the open pores to a gel, thereby forming a gel material in said open pores so as to fill them with said gel material.

6. A process according to claim 5, wherein the injection of said raw material solution for gel formation into said lightweight porous aggregate is effected by spraying.

* * * * *

UNITED STATES PATENT AND TRADEMARK OFFICE
CERTIFICATE OF CORRECTION

PATENT NO. : 4,722,861
DATED : February 2, 1988
INVENTOR(S) : Minoru SAWAIDE

It is certified that error appears in the above-identified patent and that said Letters Patent is hereby corrected as shown below:

On the cover page, Item [30], line 2, "61-19534" should read --61-19543--.

Signed and Sealed this

Second Day of August, 1988

Attest:

DONALD J. QUIGG

Attesting Officer       Commissioner of Patents and Trademarks